United States Patent [19]
Leclercq

[11] Patent Number: 4,645,643
[45] Date of Patent: Feb. 24, 1987

[54] NUCLEAR FUEL ASSEMBLY CONTAINING BURNABLE POISON

[75] Inventor: Joseph Leclercq, Saint Didier au Mont D'or, France

[73] Assignee: Fragema, Courbevoie, France

[21] Appl. No.: 461,051

[22] Filed: Jan. 26, 1983

[30] Foreign Application Priority Data

Feb. 3, 1982 [FR] France .................. 82 01734

[51] Int. Cl.⁴ .............................................. G21C 3/32
[52] U.S. Cl. .................................... 376/447; 376/438; 376/441; 376/442
[58] Field of Search ................ 376/441, 442, 438, 447

[56] References Cited

U.S. PATENT DOCUMENTS 3,122,484  2/1964  Iskenderian ...................... 376/447
4,294,660 10/1981  Christiansen ..................... 376/442

FOREIGN PATENT DOCUMENTS 1273716  7/1968  Fed. Rep. of Germany .
7433674  5/1975  France .

Primary Examiner—Donald P. Walsh
Attorney, Agent, or Firm—Pollock, Vande Sande & Priddy

[57] ABSTRACT

A nuclear fuel assembly comprises two end pieces connected by guide tubes. Grids are distributed along the guide tubes and define passages distributed according to a regular pattern. Some of the passages receive the tubes. Other passages retain fuel elements parallel to the tubes. Individual sleeves containing a burnable poison are carried by the tubes, each in a space bounded by one grid on one side, by an other grid or an end piece on the other side. The length of the sleeves is selected for allowing differential thermal expansion of the tubes and grids. One end of each sleeve may be secured to lugs of an associated grid.

12 Claims, 7 Drawing Figures

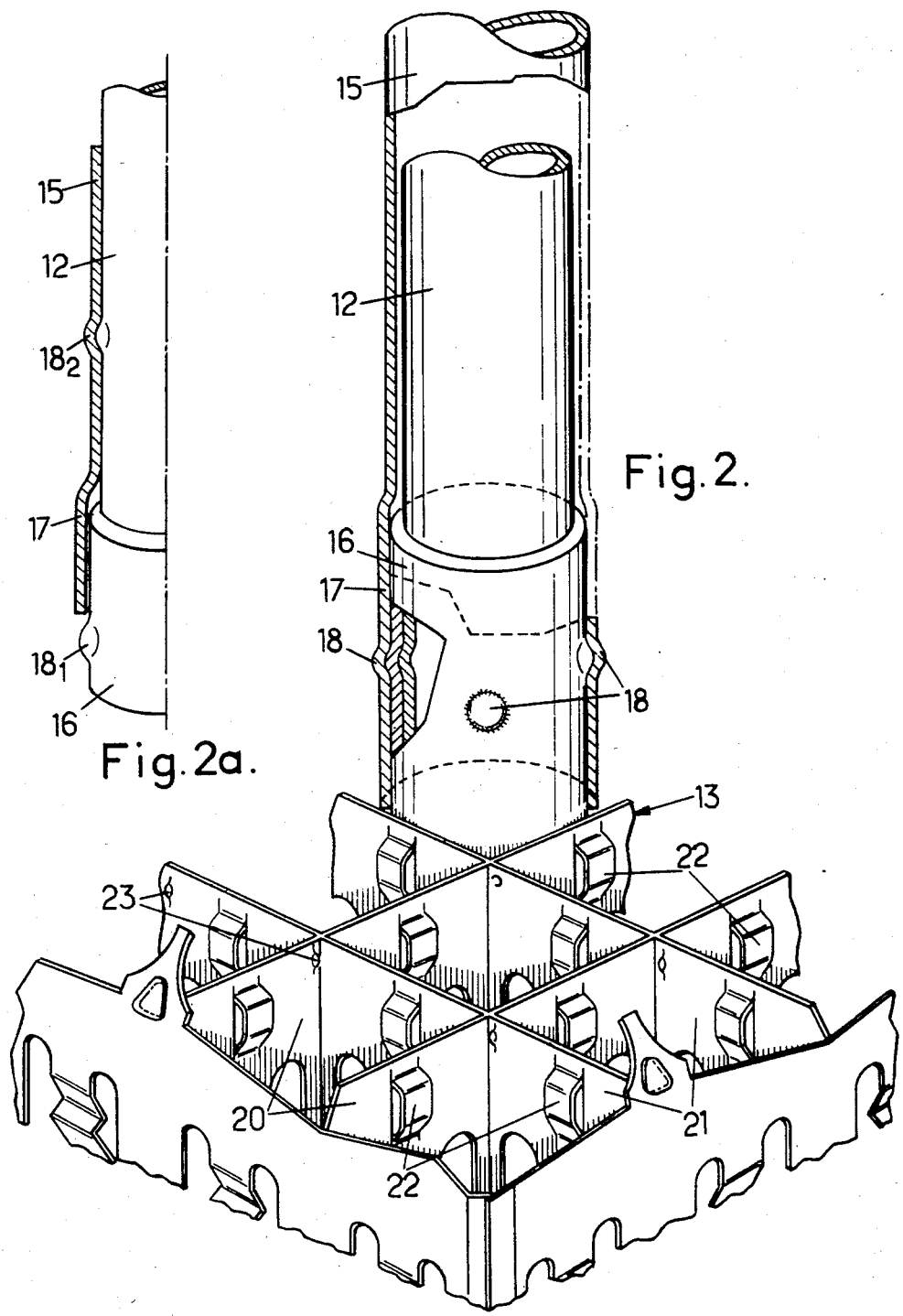

NUCLEAR FUEL ASSEMBLY CONTAINING BURNABLE POISON

FIELD OF THE INVENTION

The invention relates to fuel assemblies, also known as fuel units, for nuclear reactors, and it is particularly suitable for use in those reactors in which water constitutes the moderator and the coolant.

The invention more particularly relates to a nuclear fuel assembly of the type which as a frame comprising two end pieces connected by tubes with grids or grilles distributed along the tubes, a cluster of clad fuel rods of fuel elements being retained by the grids according to a regular pattern.

BACKGROUND OF THE INVENTION

Such fuel assemblies are used in PWRs, for instance. Some at least of the tubes form guides in which rods loaded with neutron absorbing material may be reciprocated. Such rods are connected in bundles to form control assemblies for fine adjustment of the reactivity of the reactor. In a particular embodiment, the grids and guide tubes are made of materials which are compatible and are welded together. In other embodiments, the grids are fixed to the guide tubes by deformation of sleeves threaded onto the guide and welded to the grid. In still another example (French Specification No. 2,088,009) the grids are axially slidable along the tubes for allowing axial expansion of the fuel elements during operation. Then the grids are provided with sleeves slidably received on the guide tubes. It has been suggested to include burnable or consumable poison in the fuel elements of a reactor (U.S. Pat. No. 3,625,821). A burnable poison is a material containing an element having a high neutron capture cross section which absorbs excess neutrons and does not give rise to strongly absorbent daughter products. Examples of such poisons are gadolinium, samarium, europium and, above all, boron (FR-A-No. 1,504,651).

Numerous solutions have already been proposed for incorporating the consumable poisons in a unit. One especially interesting embodiment (FR-A-No. 2 472 247) consists in placing in at least some of the guide tubes consumable poison rods comprising a casing in which annular pellets of poison (borated glass, for example) are immobilized between an end stopper and a deformation in the casing or in an internal tube. However, this arrangement has some disadvantages. Even after the poison is exhausted, the rods which contain it introduce a considerable mass of parasitic material which absorbs the neutrons and thus reduces the exploitation capacity of the fuel. The rod fills a guide tube and reduces the volume of the light water, thus also reducing the moderation, resulting in a disadvantageous use of the fuel when the reactor should be functioning with thermal neutrons. The poison rods and their associated structures occupy an important amount of storage space for long periods, since they cannot be subjected to reprocessing.

It might be thought that the above disadvantages could be eliminated by coating the internal surface of some of the guide tubes with a substrate which holds a consumable poison. However, it should be borne in mind that each unit is generally used for a plurality of successive cycles and that, after the first cycle, the guide tubes may take rods appertaining to the control rods. The rubbing of the rods against the coating is then an important wear factor. Moreover, given that the guide tubes have a mechanical resistance function in the unit, it is not possible to carry out such treatment on the tubes without re-certifying them.

SUMMARY OF THE INVENTION

The object of the present invention is to provide a fuel unit which meets the practical requirements better than those known previously, notably by eliminating to a great extent the above-mentioned disadvantages. More specifically, the object of the invention is to provide a fuel unit with consumable poison in which the addition of the poison is effected in a simple fashion, without modifying the mechanical characteristics of the unit.

To this end, the invention proposes basically a unit of the type defined above which is characterized in that it comprises sleeves fitted to the tubes and containing a consumable neutron poison.

The sleeves will normally be in the form of a length of tubing made of a material which is resistant to the coolant, of the same character as the guide tube and provided with an adhering coating containing the consumable poison. In particular, the length of tubing may be made of a zirconium alloy such as that known under the trade name "ZIRCALOY", while the adhering coating would contain boron in the form of particles of boron carbide or gadolinium. It is also possible to envisage the use of lengths of tubing made of zirconium or a zirconium alloy containing a small amount of hafnium, although hafnium has less favorable characteristics than the other poisons mentioned above.

It will be appreciated that this form of construction makes it possible to distribute the consumable poison between the fuel units and even inside a fuel unit as a function of the implantation of the unit in the core, and of the axial distribution of the power in the core. It is possible in effect to provide different concentrations of consumable poison along the sleeves and to distribute the latter axially on the guide tubes so as to take into account the axial distribution of power.

It will also be appreciated that the sleeves are easy to implant and to distribute, and that their production is not complicated like that of the rods, which entails the pelletization of the consumable poison, loading of the pellets into the casings, welding of the casings, and subsequent control operations. Finally, the sleeves have no mechanical function and may comprise a supporting length of tubing of a material which is identical with that of the guide tubes, eliminating any mechanical certification tests, and ensuring satisfactory behavior in the pile.

BRIEF DESCRIPTION OF THE DRAWINGS

The invention will be better understood by reading the following description of units constituting embodiments which are peculiar to the invention and which are given by way of example.

FIG. 2 is a view on a larger scale, showing a possible method of fixing a poison sleeve on a guide tube, in the unit shown in FIG. 1;

FIG. 2a, which is similar to part of FIG. 2, shows a modified version;

DETAILED DESCRIPTION

Figure 1:
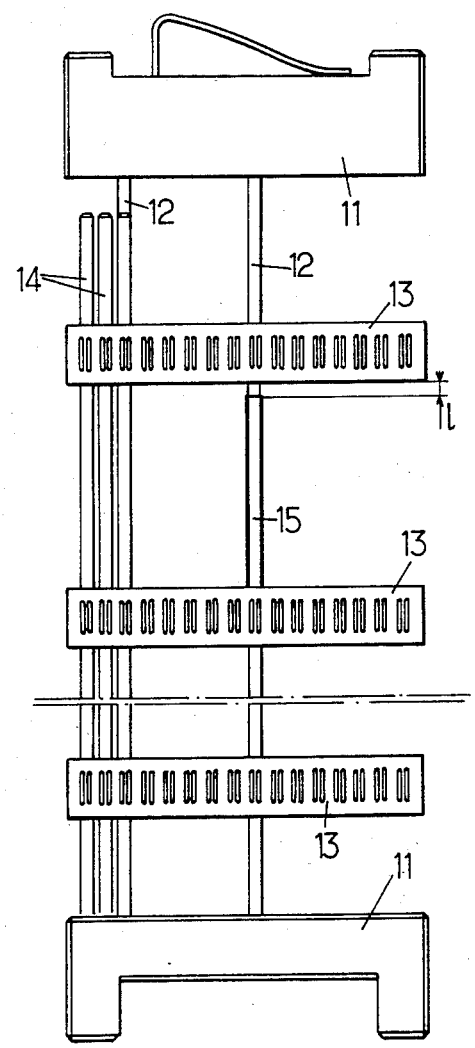
FIG. 1 shows schematically in elevation the elements of a fuel unit which are involved in the invention constituting a first embodiment.

The fuel unit of which some elements are shown in FIG. 1 may have the general form which is widely used at the present time in pressurized water reactors, such as that described in FR-A-2 384 323, for example, to which reference may be made. The skeleton frame of the unit comprises two end pieces 11 connected to each other by guide tubes 12 made of a zirconium alloy such as that designated with the trade name "ZIRCALLOY". The skeleton frame also comprises grilles 13 made of an alloy designated by the trade name "INCONEL", distributed over the interval which separates the end pieces 11. The fuel rods 14 are supported and held in a square lattice formation by the grilles 13, certain cells of which are occupied by the guide tubes 12. These grilles (FIG. 2) comprise two sets of intersecting strips 20 and 21 equipped with bosses 22 and elastic holding springs (not shown) for the rods 14. Additional bosses 23 ensure that the strips 20 and 21 are held precisely in place relative to each other.

At least some of the guide tubes 12 bear one or more sleeves of consumable poison. Each of the sleeves 15 made of "ZIRCALOY" surrounds a guide tube 12 between two grilles 13 or between a grille and an end piece 11. The lower part of the sleeve 15 is substantially in contact with the grille 13 or with the piece 11 disposed beneath, on which it can rest. The length of the sleeve is so selected that before being put into use a certain amount of play 1 exists between the upper end of the sleeve and the grille or the end piece disposed above it. This amount of play 1 is chosen so that it is sufficient to prevent the sleeve from hammering due to differential expansion with temperature and under the effect of irradiation, but it is kept to a minimum value so that the local absence of a neutron absorbent does not introduce any significant peaks in the neutron flux in the core. In the case of FIG. 1, this play will preferably be between 0.3 and 1.0 mm for a unit normally used in 900 MW pressurized water reactors at the present time, in which the distance between the grilles is approximately 500 mm.

Various solutions may be adopted for fixing the sleeves 15. In the method shown in FIG. 2, which can be used more especially when the grille 13 is made of "INCONEL" and the guide tube 12 is made of "ZIRCALOY", the guide tube 12 and the end section of the sleeve 15 are joined by means of a coupling sleeve 16 attached permanently to the grille, generally by welding. In just the same way, this result may be obtained by brazing. For this purpose the sleeve 15 has an end section 17 which is enlarged to enable it to slide with slight friction against the coupling sleeve 16 with the guide tube 12 passed through. Thus, the unit formed by the guide tube, the coupling sleeve 16 and the sleeve 15 is deformed by expansion, preferably in four zones 18 disposed on the perpendiculars of the angles of the cell in the grille occupied by the guide tube. In this way, disturbance to the flow of the coolant is reduced as much as possible.

In the version shown in FIG. 2a, the sleeve 15 is fixed in two stages. In a first stage the coupling sleeve 16 is fixed on the guide tube 12 by local radial deformation or circumferential deformation, by expansion in the zones $18_1$, or by rolling. Then the sleeve 15 is fixed to the guide tube 12 in the zone where the sleeve is not enlarged, also by local or circumferential expansion at $18_2$. The enlarged end section 17 of the sleeve 15 in this case is engaged with slight friction on the coupling sleeve 16 above the deformed zones $18_1$.

As mentioned above, the sleeves are preferably constituted by a support made of a material with a zirconium base, such as "ZIRCALOY", which has the advantage of being transparent to neutrons, so that once the consumable poison has been exhausted after the first flow from the fuel in the reactor, the presence of the sleeves is not manifested by any absorption of neutrons and will allow better use of the energy released by the unit during the subsequent cycles of flow in the reactor. The consumable poison, generally constituted by a boron or gadolinium compound, should have a metallurgical bond with the support which is sufficient to resist the action of the coolant. In a light water reactor, this bond should be effected by hot-spraying a mixture of the compound and a metal binding agent such as nickel, which is compatible with the corrosion resistance and has a satisfactory transparency to neutrons.

The radial mass of each sleeve and its fixing means should be such that the sleeve does not cause any appreciable disturbance to the flow and cooling of the fuel. This condition means in particular that the thickness of the sleeves coated with the poison should be as small as possible. The limiting thickness of the substrate is determined by the process used to apply the coating, which is a function of the poison content which is necessary. By way of example, it may be stated that it is possible to produce coated sleeves with a thickness in the order of 0.5 mm, where 0.3 mm of the thickness is taken up by the "ZIRCALOY" support.

If the sleeves according to the invention are used, it is possible to have whatever distribution of the neutron poison may be desirable in the unit. In particular, sleeves 15 with a strong concentration of consumable poison may be placed in the median section of all or some of the guide tubes, while the end sections of these same guide tubes either do not bear any sleeve, or bear sleeves with a low concentration of consumable poison.

Figure 3:
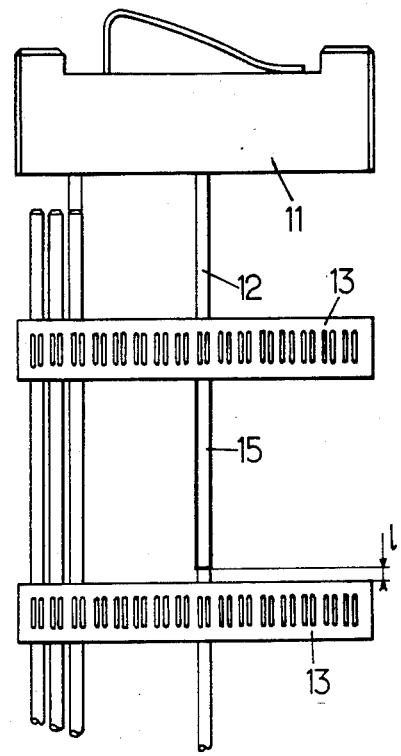
FIG. 3, similar to FIG. 1, shows another method of construction.
Figure 4:
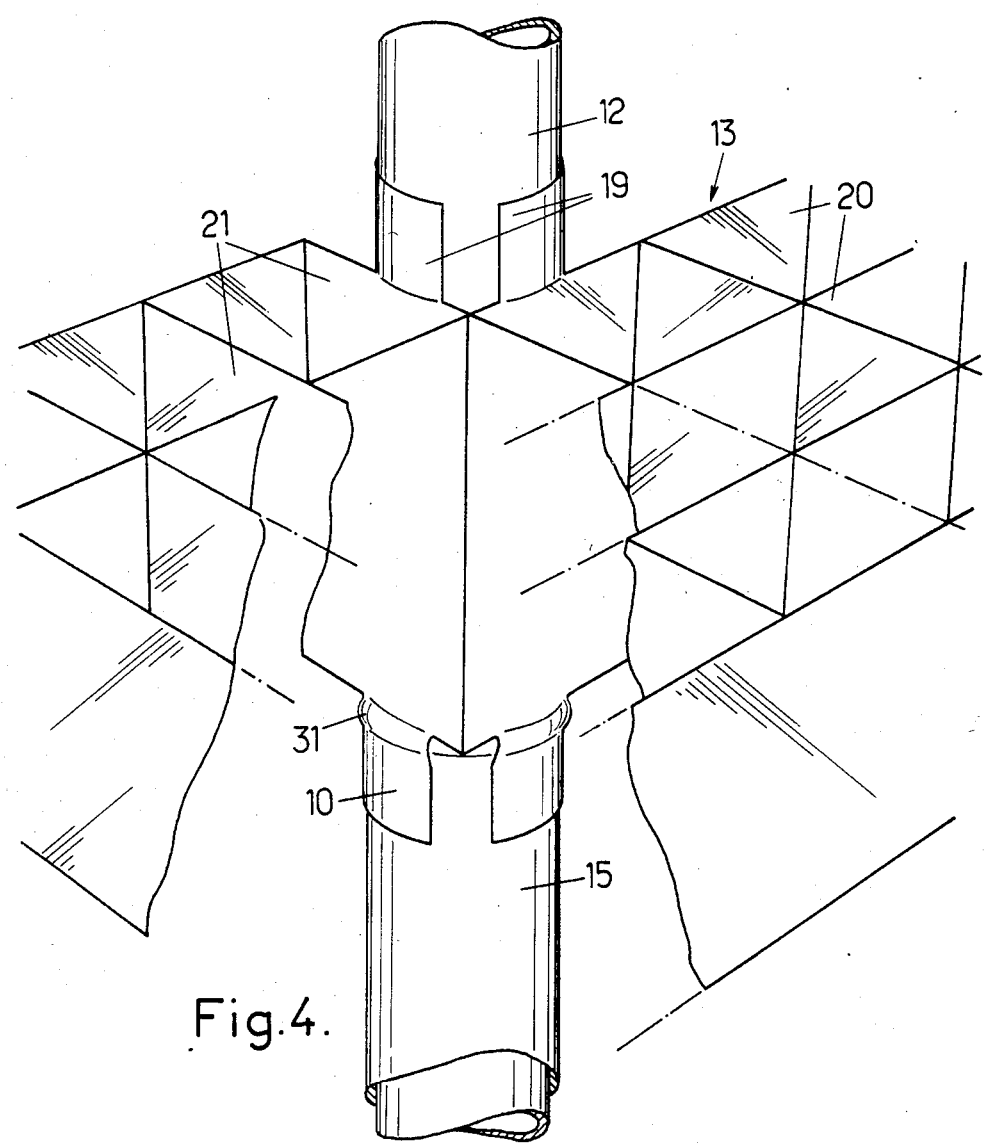
FIG. 4 is a perspective sketch on a large scale, showing a possible method for fixing the sleeves in the unit shown in FIG. 3.

An embodiment which finds particular application in the case where the guide tubes 12 and the grilles 13 are made from metals or alloys which are identical or compatible will now be described with reference to FIG. 3. The construction shown in FIG. 3 is especially appropriate when the grilles 13 and the guide tubes 12 are made of "ZIRCALOY". In this case each sleeve 15 is attached by its upper end to a grille 13 and the play 1 is provided between the lower end of the sleeve 15 and the element which is situated beneath (grille or end piece). The amount of play 1 in this case is chosen not only as a function of the two criteria mentioned above (minimum value, but compatible with the free differential expansion of the components), but also to allow the grille to be fixed on the guide tube. In the case of a grille, this fixing may be effected by welding as indicated in FIG. 4. It will be seen from this figure that the strips 20 and 21 are joined to lugs or tabs 10 and 19 which are previously cut out and shaped, for example by stamping, to give, in the case of the tab 10, a deformation 31 corresponding to the extra thickness represented by the sleeve 15 at the lower part of the grille. The welding of the lugs 10 on the lower part and 19 on the upper part may be carried out in a conventional way, onto the guide tubes and also onto the sleeve.

Figure 5:
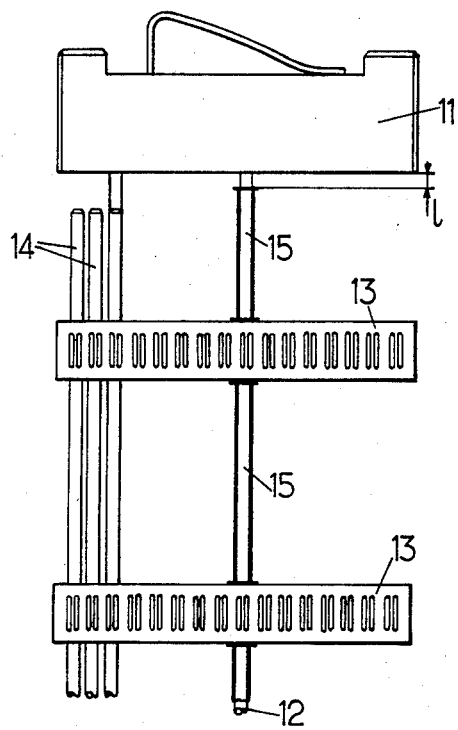
FIGS. 5 and 6, similar to FIG. 3, show further embodiments according to the invention.

In the version shown in FIG. 5, the fuel unit is the type described in FR-A-No. 2 088 009, i.e., it comprises grilles 13 mounted "floating" along the guide tubes. In this case the sleeves 15 act as crosspieces to the grilles 13. The amount of play 1 is chosen this time to accommodate the axial elongation of the fuel rods 14 under irradiation and the sleeves 15 may be the same length between the floating grilles as the initial distance between the grilles.

Figure 6:
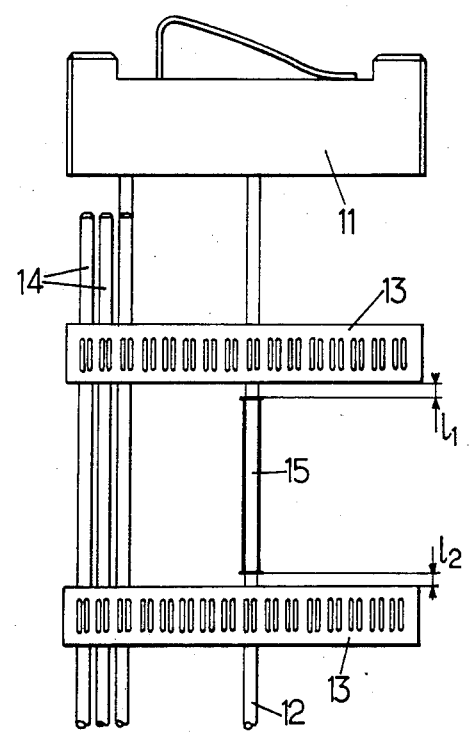

Finally, in the version shown in FIG. 6, the grilles 13 are attached to the guide tubes by any means, particularly those shown in FIGS. 2, 2a or 3. Each of the sleeves 15 is mounted in a floating manner between two grilles 13 or between a grille and an end piece 11. The total amount of play 1 will then be equal to the sum of the amount of play at the ends, $1_1$ and $1_2$. This total amount of play 1, again determined so as to meet the criteria mentioned above, further facilitates the fixing of the grilles 13 to the guide tubes 12 during production.

Although the invention has been described predominantly in its application to fuel units for light water reactors of the conventional type, it is open to numerous other embodiments, either intended for light water reactors with a variation in the energy spectrum of the neutrons during the life of the reactor, or for reactors which use a coolant other than light water.

I claim:

1. A nuclear fuel assembly for a nuclear reactor, comprising a frame having two end pieces, a plurality of parallel spacer tubes connecting said end pieces and a plurality of grids distributed along said tubes and defining passages distributed according to a regular pattern, a bundle of fuel elements each traversing one of said passages and parallel to said tubes, and sleeves containing a burnable neutron poison carried by said tubes in spaces bounded by one of said grids on one side, by one of said grids and end pieces on the other side, each of the said sleeves being received on the associated said tube for free differential expansion thereon.

2. A fuel assembly according to claim 1, wherein each sleeve is formed by a support made of a length of tubing of a material which is resistant to a coolant, is of the same character as the material of said tubes and is provided with an adhering coating containing the consumable poison.

3. A fuel assembly according to claim 2, wherein the length of tubing is made of a zirconium alloy and the adhering coating contains boron or gadolinium.

4. A fuel assembly according to claim 2, wherein the coating of consumable poison is joined to the support by a metal bonding agent such as nickel.

5. A fuel assembly according to any one of claims 1 to 4, wherein the grids are fixed to the tubes by deforming the tube and a coupling ring welded to the grid.

6. A fuel assembly according to claim 5, wherein each said sleeve is attached to the associated guide tube by local or circumferential deformation of a unit formed by the guide tube, the coupling ring and an enlarged end section of the sleeve.

7. A fuel assembly according to claim 5, wherein each sleeve is fixed to its guide tube by local or circumferential deformation of the guide tube and sleeve assembly at a zone which is separate from the zone for fixing the coupling ring to the guide tube.

8. A fuel assembly according to claim 1, wherein said grids are formed with lugs projecting on both sides of a grid, those lugs which are located on one side being welded to one of said sleeves and those lugs which are located on the other side being welded to that guide tube which carries said one sleeve.

9. A fuel assembly according to claim 1, wherein each said sleeve is shorter than said space, whereby free differential expansion of said sleeves and tubes is allowed.

10. A nuclear fuel assembly according to claim 9 fur use in a pressurized water reactor, wherein the said space between adjacent grids is approximately 500 millimeters and the difference between said space and the length of an individual one of said sleeve is between 0.3 and 1 millimeter.

11. A nuclear fuel assembly for a nuclear reactor comprising a plurality of parallel tubes secured to end pieces of a frame of said assembly, and vertical in use; a plurality of grids located at different levels between said end pieces, having two mutually orthogonal sets of blades defining passages distributed according to a square pattern, some of which are traversed by said tubes directly fixed to said blades; a bundle of fuel elements parallel to said tubes, received between said end pieces and slidably received in other ones of said passages; a plurality of sleeves each carried for free differential expansion thereof by a portion of one of said tubes which is comprised between one of said grids and an adjacent one of said grids and end pieces; having a length not in excess of the length of said portion, and means for securing an end portion only of each said sleeve to said one of said grids, comprising projecting lugs of said blades straddling said end portion and securely connected thereto.

12. A fuel assembly according to claim 11, wherein said lugs of said blades are located on one side of said grid and wherein said blades are further formed with additional lugs located on the other side of said grid, straddling said tube and welded thereto.

* * * * *